(12) United States Patent
Huang

(10) Patent No.: US 11,986,733 B2
(45) Date of Patent: *May 21, 2024

(54) OBJECT CONTROL METHOD AND APPARATUS, STORAGE MEDIUM AND ELECTRONIC DEVICE

(71) Applicant: TENCENT TECHNOLOGY (SHENZHEN) COMPANY LIMITED, Shenzhen (CN)

(72) Inventor: Xiongfei Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 285 days.

This patent is subject to a terminal disclaimer.

(21) Appl. No.: 17/358,884

(22) Filed: Jun. 25, 2021

(65) Prior Publication Data

US 2021/0322882 A1 Oct. 21, 2021

Related U.S. Application Data

(63) Continuation of application No. PCT/CN2020/088614, filed on May 6, 2020.

(30) Foreign Application Priority Data

May 17, 2019 (CN) .......................... 201910413399.9

(51) Int. Cl.
*A63F 13/57* (2014.01)
*A63F 13/2145* (2014.01)
*A63F 13/803* (2014.01)

(52) U.S. Cl.
CPC .......... *A63F 13/57* (2014.09); *A63F 13/2145* (2014.09); *A63F 13/803* (2014.09)

(58) Field of Classification Search
CPC ...................................................... A63F 13/00
See application file for complete search history.

(56) References Cited

U.S. PATENT DOCUMENTS 6,171,186 B1 * 1/2001 Kurosawa ............... A63F 13/45
463/31
9,687,741 B1 6/2017 Kim et al.
(Continued)

FOREIGN PATENT DOCUMENTS

CN 101485933 A 7/2009
CN 109513210 B 2/2012
(Continued)

OTHER PUBLICATIONS

CN109513210A, English Translation (Year: 2019).*
(Continued)

*Primary Examiner* — Jay Trent Liddle
*Assistant Examiner* — Alyssa N Brandley
(74) *Attorney, Agent, or Firm* — Crowell & Moring LLP

(57) ABSTRACT

This application discloses an object control method and device, a storage medium and an electronic device. The method includes detecting a target angle generated in a process that a first target object performs an action combination during a game task, the action combination comprising performing a target action at least twice; triggering a state adjustment instruction in response to the target angle reaching a trigger threshold, the state adjustment instruction being used for instructing to adjust a movement state of the first target object; and adjusting, based on the state adjustment instruction, the movement state from a first state to a second state, a first time duration consumed by the first target object in the first state to complete the game task being longer than a second time duration consumed by the first target object in the second state to complete the game task.

20 Claims, 12 Drawing Sheets

(56) References Cited

U.S. PATENT DOCUMENTS

| | | | | |
|---|---|---|---|---|
| 2020/0086214 | A1* | 3/2020 | Yabuki | A63F 13/803 |
| 2021/0260478 | A1* | 8/2021 | Huang | A63F 13/42 |
| 2021/0260484 | A1* | 8/2021 | Huang | A63F 13/2145 |
| 2022/0168645 | A1 | 6/2022 | Huang et al. | |

FOREIGN PATENT DOCUMENTS

| | | |
|---|---|---|
| CN | 106861186 A | 6/2017 |
| CN | 107744665 A | 3/2018 |
| CN | 108434730 A | 8/2018 |
| CN | 108525303 A | 9/2018 |
| CN | 108536350 A | 9/2018 |
| CN | 108939546 A | 12/2018 |
| CN | 109107152 A | 1/2019 |
| CN | 109513210 A | 3/2019 |
| CN | 109513210 A | 3/2019 |
| CN | 109806590 A | 5/2019 |
| CN | 110201387 A | 9/2019 |
| CN | 108939546 B | 9/2021 |
| WO | WO2008/123398 A1 | 10/2008 |

OTHER PUBLICATIONS

Salma Alrasheed, "Impulse, Momentum, and Collisions", (May 1, 2019), Principles of Mechanics, pp. 73-85, https://link.springer.com/chapter/10.1007/978-3-030-15195-9_5 (Year: 2019).*

Singapore Office Action and Written Opinion regarding 11202108545W dated Nov. 22, 2022, 12 pages.

Extended European Search Report regarding EP19857869.2 dated Sep. 8, 2021, 7 pages.

Girdhar et al., "ActionVLAD: Learning spatio-temporal aggregation for action classification" arxiv.org, Cornell University Library, 201 OLIN Library, Cornell University Ithaca, NY, April 10, 2017, 14 pages.

Arandjelovic et al., "NetVLAD: CNN Architecture for Weakly Supervised Place Recognition," 2016 IEEE Conference on Computer Vision and Pattern Recognition (CVPR), IEEE, Jun. 27,2016, pp. 5297-5307.

Miech et al., "Learnable pooling 1-14 with Context Gating for video classification," arxiv.org, Cornell University Library, 201 OLIN Library Cornell University, Ithaca, NY, Jun. 21, 2017, 8 pages.

International Search Report with concise translation and Written Opinion regarding PCT/CN2020/088614 dated Aug. 5, 2020, 10 pgs.

First Chinese Office Action with concise English explanation regarding 201910413399.9 dated Mar. 11, 2020, 11 pgs.

Second Chinese Office Action with concise English explanation regarding 201910413399.9 dated Jan. 18, 2021, 7 pgs.

Video related to experts challenge the L2 driver's license test with a cart, Huya wind tired, running kart mobile game closed beta, Century Tiancheng cooperation with Tencent www.bilibili.com/video/av460775077?from=search&seid=9311118654848197163.

Korean Office Action with Machine Translation regarding 10-2021-7026018 dated Apr. 13, 2023.

Japanese Office Action with English translation regarding JP2021-538739 dated Mar. 24, 2023.

youtube Video Clip, retrieved at: https://www.utube.com/watch?v=dZE5uBOLi50, Dec.11, 2013.

Kang, "Simple but Effective Vehicle Wheel Simulation based on Imaginary Wall and Impulse Model for Racing Game" with English abstract, 7 pages.

Notice of Reasons for Refusal dated Sep. 21, 2020 in corresponding Japanese Patent No. 2021-538739 with English translation (12 pages).

Crash Bandicoot Racing, Dengeki Play Station, Media Dear Works, dated Nov. 12, 1999, vol. 5, No. 30, 202-202 (6 pages).

Mario Kart 8 Deluxe, TV Game Magazine, Sep. 2017, Gz Brain Co., Ltd. Dated Aug. 3, 2017 (9 pages).

Mario Kart 8 Deluxe Perfect Guide Super—First Edition MarioKart (8 pages).

Deluxe, $1^{st}$ edition, Kadokawa Col, Ltd., May 10, 2018, p. 261 (8 pages).

* cited by examiner

OBJECT CONTROL METHOD AND APPARATUS, STORAGE MEDIUM AND ELECTRONIC DEVICE

RELATED APPLICATION

This application is a continuation application of PCT Patent Application No. PCT/CN2020/088614, filed on May 6, 2020, which claims priority to Chinese Patent Application No. 201910413399.9, filed with the China National Intellectual Property Administration on May 17, 2019, both of which are incorporated herein by reference in their entireties.

FIELD OF THE TECHNOLOGY

This application relates to the computer field, and specifically, to object control.

BACKGROUND OF THE DISCLOSURE

Currently, in a game scene of a racing game application, different racing tracks are usually designed for a player, and the racing tracks include bends with different turning angles. To shorten a time consumed by a target object controlled by the player to drive through a bend, the player usually controls, by using a control button that is set in a human-computer interaction interface, the target object to perform a drift action during passing through the bend.

The present disclosure describes various embodiments for controlling an object, addressing one or more problems/issues and improving user experience in at least one aspect, for example but not limited to, shortening a time of control over a target object in a game task, completing a game task as soon as possible, improving a win rate in a game task, and/or overcoming a problem that user's control time is increased due to a relatively high operation complexity of a game task.

SUMMARY

Embodiments of this application provide an object control method and device, a storage medium and an electronic device, to at least resolve a technical problem that a control time is increased due to relatively high operation complexity.

The present disclosure describes a method for controlling an object. The method includes detecting, by a device, a target angle generated in a process that a first target object performs an action combination during a game task, the action combination comprising performing a target action at least twice, and the target angle being an angle between an advancing direction and a sliding direction of the first target object. The device includes a memory storing instructions and a processor in communication with the memory. The method includes triggering, by the device, a state adjustment instruction in response to the target angle reaching a trigger threshold, the state adjustment instruction being used for instructing to adjust a movement state of the first target object; and adjusting, by the device based on the state adjustment instruction, the movement state of the first target object from a first state to a second state, a first time duration consumed by the first target object in the first state to complete the game task being longer than a second time duration consumed by the first target object in the second state to complete the game task.

The present disclosure describes an apparatus for controlling an object. The apparatus includes a memory storing instructions; and a processor in communication with the memory. When the processor executes the instructions, the processor is configured to cause the apparatus to perform: detecting a target angle generated in a process that a first target object performs an action combination during a game task, the action combination comprising performing a target action at least twice, and the target angle being an angle between an advancing direction and a sliding direction of the first target object, triggering a state adjustment instruction in response to the target angle reaching a trigger threshold, the state adjustment instruction being used for instructing to adjust a movement state of the first target object, and adjusting, based on the state adjustment instruction, the movement state of the first target object from a first state to a second state, a first time duration consumed by the first target object in the first state to complete the game task being longer than a second time duration consumed by the first target object in the second state to complete the game task.

The present disclosure describes a non-transitory computer readable storage medium storing computer readable instructions. The computer readable instructions, when executed by a processor, are configured to cause the processor to perform: detecting a target angle generated in a process that a first target object performs an action combination during a game task, the action combination comprising performing a target action at least twice, and the target angle being an angle between an advancing direction and a sliding direction of the first target object; triggering a state adjustment instruction in response to the target angle reaching a trigger threshold, the state adjustment instruction being used for instructing to adjust a movement state of the first target object; and adjusting, based on the state adjustment instruction, the movement state of the first target object from a first state to a second state, a first time duration consumed by the first target object in the first state to complete the game task being longer than a second time duration consumed by the first target object in the second state to complete the game task.

According to another aspect of the embodiments of this application, an object control method is provided, performed by a user equipment, the method including: detecting, in a process that a first target object controlled by a client performs a round of game task, a target angle generated in a process that the first target object performs an action combination once, the action combination including performing a target action at least twice according to the same direction, and the target angle being an angle between an advancing direction and a sliding direction of the first target object; triggering a state adjustment instruction in a case that the target angle reaches a trigger threshold, the state adjustment instruction being used for instructing to adjust a movement state of the first target object; and adjusting the movement state of the first target object from a first state to a second state in response to the state adjustment instruction, a time consumed by the first target object to complete the game task in the first state being greater than a time consumed by the first target object to complete the game task in the second state.

According to another aspect of the embodiments of this application, an object control apparatus is further provided, including: a detection unit, configured to detect, in a process that a first target object controlled by a client performs a round of game task, a target angle generated in a process that the first target object performs an action combination once, the action combination including performing a target action at least twice according to the same direction, and the target angle being an angle between an advancing direction and a sliding direction of the first target object; a trigger unit, configured to trigger a state adjustment instruction in a case that the target angle reaches a trigger threshold, the state adjustment instruction being used for instructing to adjust a movement state of the first target object; and an adjustment unit, configured to adjust the movement state of the first target object from a first state to a second state in response to the state adjustment instruction, a time consumed by the first target object to complete the game task in the first state being greater than a time consumed by the first target object to complete the game task in the second state.

According to still another aspect of the embodiments of this application, a storage medium is further provided, storing a computer program, the computer program being configured to perform, when run, the foregoing object control method.

According to still another aspect of the embodiments of this application, an electronic device is further provided, including a memory, a processor and a computer program stored in the memory and executable on the processor, the processor performing the foregoing object control method by using the computer program.

According to still another aspect of the embodiments of this application, a computer program product including instructions is further provided, the instructions, when run on a computer, causing the computer to perform the foregoing object control method.

BRIEF DESCRIPTION OF THE DRAWINGS

The accompanying drawings described herein are used to provide a further understanding of this application, and form part of this application. Exemplary embodiments of this application and descriptions thereof are used to explain this application, and do not constitute any inappropriate limitation to this application. In the accompanying drawings.

DESCRIPTION OF EMBODIMENTS

In order to make persons skilled in the art better understand the solutions of this application, the following clearly and completely describes the technical solutions in the embodiments of this application with reference to the accompanying drawings in the embodiments of this application. Apparently, the described embodiments are only some of the embodiments of this application rather than all of the embodiments. All other embodiments obtained by a person of ordinary skill in the art based on the embodiments of this application without creative efforts shall fall within the protection scope of this application.

In this specification, claims, and accompanying drawings of this application, the terms "first", "second", and so on are intended to distinguish similar objects but do not necessarily indicate a specific order or sequence. It is to be understood that such used data is interchangeable where appropriate so that the embodiments of this application described here can be implemented in an order other than those illustrated or described here. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

According to an aspect of the embodiments of this application, an object control method is provided. Optionally, in an optional implementation, the object control method is applicable to, but is not limited to, a network environment shown in FIG. 1. It is assumed that a client of a game application (a client of a racing game application shown in FIG. 1) is installed on a user equipment 102. The user equipment 102 includes a human-computer interaction screen 104, a processor 106, and a memory 108. The human-computer interaction screen 104 is configured to detect a human-computer interaction operation (for example, a touch operation) through a human-computer interaction interface corresponding to the client. The processor 106 is configured to generate a corresponding operation instruction according to the human-computer interaction operation, and control a first target object controlled by the client to perform a corresponding operation in response to the operation instruction. The memory 108 is configured to store the operation instruction and attribute information related to the first target object. For example, the attribute information may include, but is not limited to, a movement state of the first target object.

Figure 1:
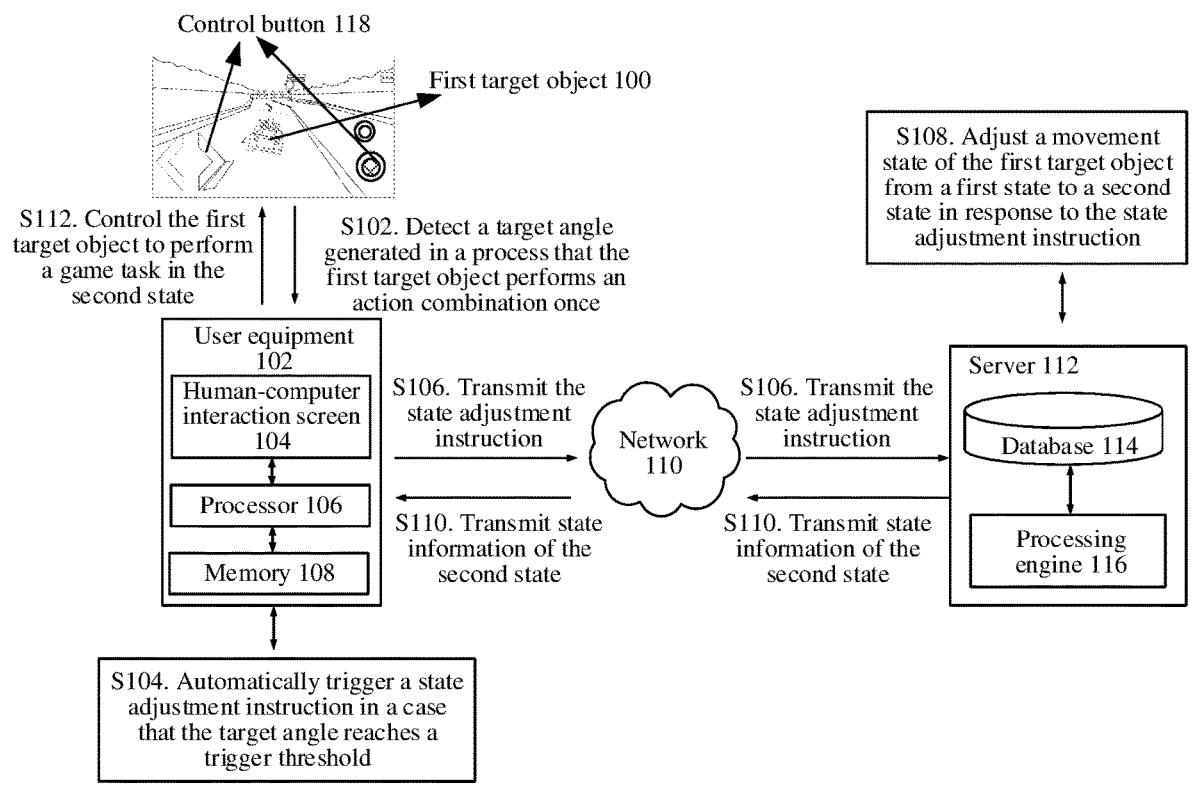
FIG. 1 is a schematic diagram of a network environment of an optional object control method according to an embodiment of this application.

In a process that the client installed on the user equipment 102 controls the first target object 100 to perform a round of game task, in S102, a target angle generated in a process that the first target object 100 performs an action combination once is detected by using the human-computer interaction screen 104 (as shown in FIG. 1, a control button 118 displayed in a human-computer interaction interface is configured to control execution of an action in the action combination). The action combination includes performing a target action at least twice according to the same direction, and the target angle is an angle between an advancing direction and a sliding direction of the first target object 100.

Further, in S104, in a case that the processor 106 detects that the target angle reaches a trigger threshold stored in the memory 108, a state adjustment instruction used for adjusting the movement state of the first target object 100 is triggered. In S106, the state adjustment instruction is transmitted to a server 112 through a network 110. The server 112 includes a database 114 and a processing engine 116. The database 114 is configured to store state information of a first state and a second state and a mapping relationship between the movement state and the state adjustment instruction. The processing engine 116 is configured to determine the state information of the adjusted-to second state according to the received state adjustment instruction.

According to the received state adjustment instruction, the processing engine 116 in the server 112 then performs, according to the mapping relationship stored in the database 114, S108 of adjusting the movement state of the first target object 100 from the first state to the second state. Then, in S110, the state information of the second state is transmitted to the user equipment 102 through the network 110. Further, the processor 106 in the user equipment 102 may further optionally perform S112 of controlling the first target object 100 to perform the game task in the second state.

Figure 2:
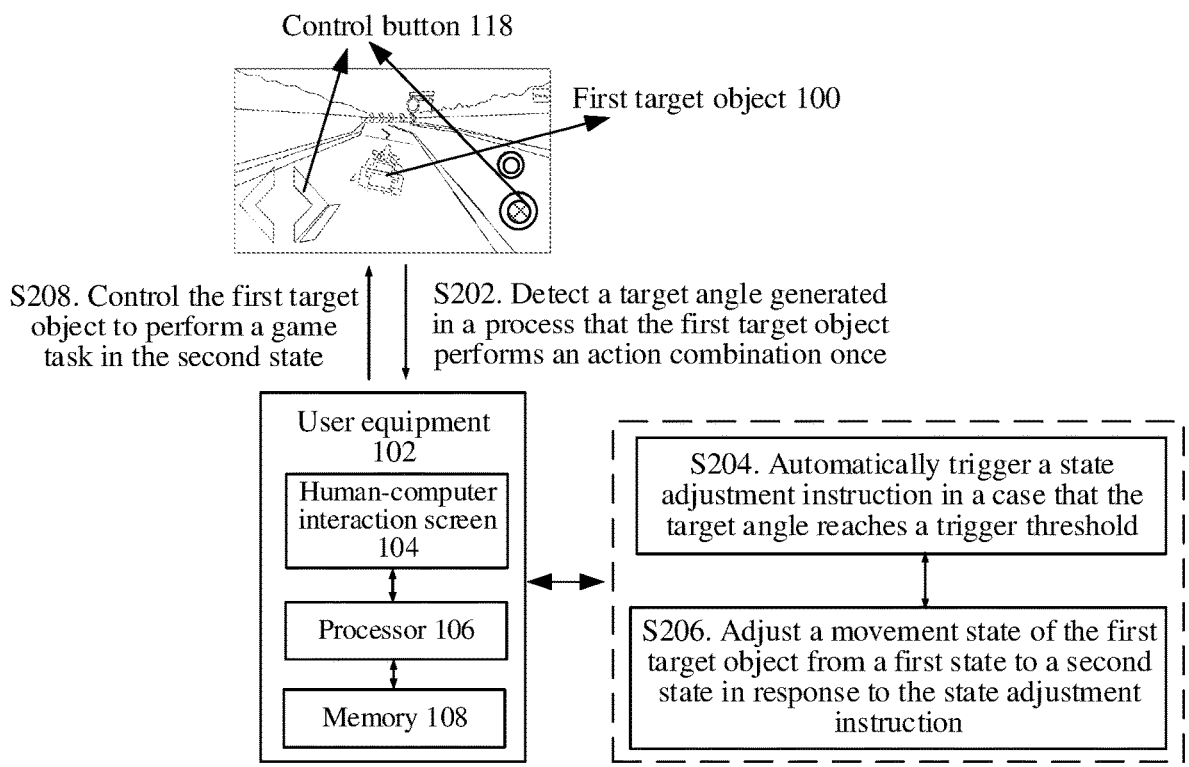
FIG. 2 is a schematic diagram of a hardware environment of an optional object control method according to an embodiment of this application.

In addition, in an optional implementation, the object control method is further applicable to, but is not limited to, a hardware environment shown in FIG. 2. It is still assumed that a client of a game application (a client of a racing game application shown in FIG. 2) is installed on a user equipment 102. The user equipment 102 includes a human-computer interaction screen 104, a processor 106, and a memory 108. The user equipment 102 performs S202 to S206 by using the processor 106. In S202, a target angle generated in a process that a first target object 100 performs an action combination once is detected by using the human-computer interaction screen 104 (as shown in FIG. 1, a control button 118 displayed in a human-computer interaction interface is configured to control execution of an action in the action combination). The action combination includes performing a target action at least twice according to the same direction, and the target angle is an angle between an advancing direction and a sliding direction of the first target object 100. Then, in S204 and S206, in a case of detecting that the target angle reaches a trigger threshold stored in the memory 108, a state adjustment instruction used for adjusting a movement state of the first target object 100 is automatically triggered by using the processor 106, and the movement state of the first target object 100 is adjusted from a first state to a second state in response to the state adjustment instruction. A first time consumed by the first target object 100 to complete a game task in the first state is greater than a second time consumed by the first target object 100 to complete the game task in the second state. Next, S208 of controlling the first target object 100 to perform the game task in the second state may be further optionally performed.

In this embodiment, in a process that the first target object controlled by the client performs a round of game task, in a case of detecting that a target angle generated in a process that the first target object performs the action combination reaches the trigger threshold, the state adjustment instruction used for adjusting the movement state of the first target object is automatically triggered, so that the first target object adjusts the movement state to the second state, and performs the game task in the second state rather than in the first state. In this way, an objective of shortening a time of control over the first target object in the game task is achieved, and the first target object can complete the game task as soon as possible, thereby improving a win rate in the game task and further overcoming a problem that the control time is increased due to relatively high operation complexity in the related art.

The present disclosure describes various embodiments for controlling an object, addressing one or more problems/issues and improving user experience in at least one aspect, for example but not limited to, shortening a time of control over a target object in a game task, completing a game task as soon as possible, improving a win rate in a game task, and/or overcoming a problem that user's control time is increased due to a relatively high operation complexity of a game task.

Optionally, in various embodiments, the user equipment may be, but is not limited to, a computer device that supports running of an application client, such as a mobile phone, a tablet computer, a notebook computer, or a PC. The foregoing description is merely an example, which is not limited in this embodiment.

Figure 3:
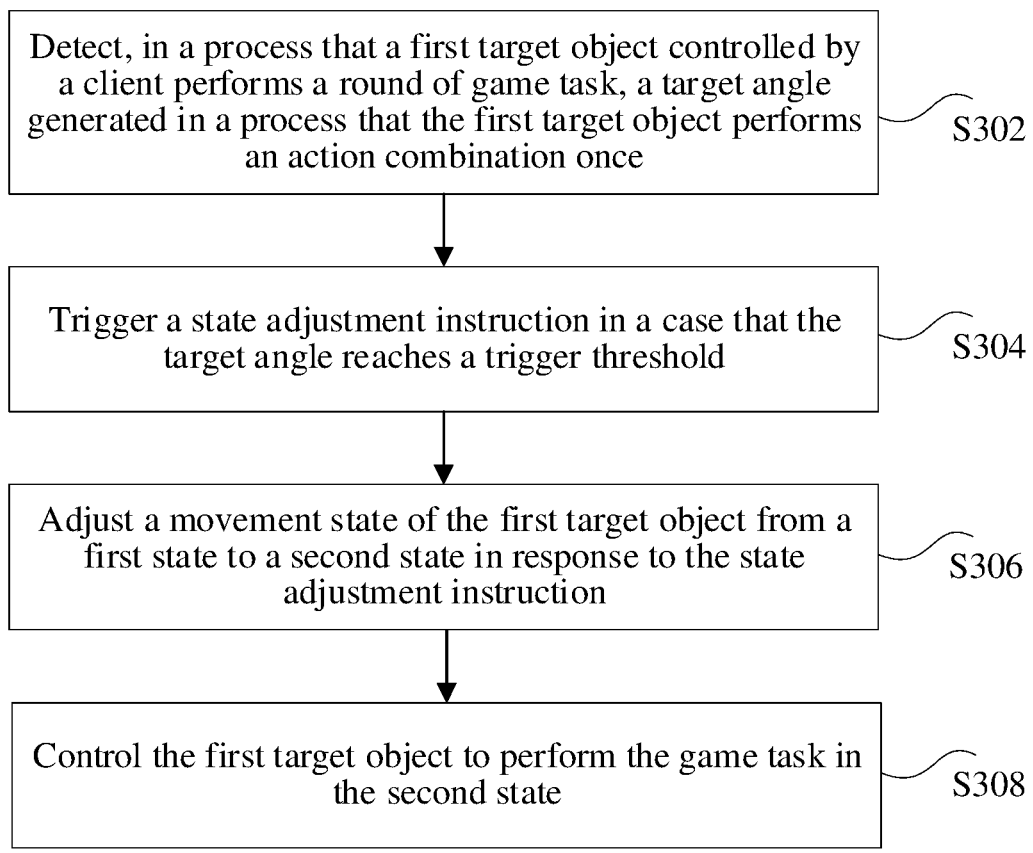
FIG. 3 is a flowchart of an optional object control method according to an embodiment of this application.

In an optional implementation, as shown in FIG. 3, the object control method may include a portion or all of the following steps.

S302. Detect, in a process that a first target object controlled by a client performs a round of game task, a target angle generated in a process that the first target object performs an action combination once, the action combination including performing a target action at least twice according to the same direction, and the target angle being an angle between an advancing direction of the first target object and a sliding direction of the first target object. In one implementation, the target angle may be a drift angle generated in a process that a virtual vehicle performs two drift actions during passing through the U-shaped bend. During a drift action, a user may intentionally oversteer the virtual vehicle, so that the virtual vehicle may achieve loss of traction, and/or the user may still maintain control and drive the car through a curve.

In another implementation, the step 302 may alternatively include detecting, by a device comprising a memory storing instructions and a processor in communication with the memory, a target angle generated in a process that the first target object performs an action combination during a game task, the action combination comprising performing a target action at least twice, and the target angle being an angle between an advancing direction and a sliding direction of the first target object.

S304. Trigger a state adjustment instruction in a case that the target angle reaches a trigger threshold, the state adjustment instruction being used for instructing to adjust a movement state of the first target object.

In one implementation, the step S304 may alternatively include determining whether the target angle reaches a trigger threshold; in response to determining that the target angle reaches the trigger threshold, triggering a state adjustment instruction which is used for instructing to adjust a movement state of the first target object. Here, "reach" a threshold may refer to "be equal to" and/or "be larger than" the threshold.

In another implementation, the step S304 may alternatively include triggering, by the device, a state adjustment instruction in response to the target angle reaching a trigger threshold, the state adjustment instruction being used for instructing to adjust a movement state of the first target object.

A manner of triggering the state adjustment instruction is not limited in the embodiments of this application, for example, may include automatic trigger and indication-based trigger.

The automatic trigger is to automatically trigger the state adjustment instruction in a case that the target angle reaches the trigger threshold.

A quantity of operations of a user during controlling the first target object to perform a game task may be reduced by using the automatic trigger.

The indication-based trigger is to trigger the state adjustment instruction in a case that a specified user operation is detected. For example, in a case of determining that the target angle reaches the trigger threshold, a user is prompted by a displayed virtual control, for the user to decide a trigger time autonomously, and in a case that a specified user operation generated by the user by touching the virtual control is obtained, the state adjustment instruction is triggered.

Through the indication-based trigger, the user may choose whether to switch the movement state of the first target object autonomously, thereby giving play to a competition level of the user and improving competition experience of the user.

For ease of description, the solutions are mainly described in the following embodiments with respect to the automatic trigger.

S306. Adjust the movement state of the first target object from a first state to a second state in response to the state adjustment instruction, a time consumed by the first target object to complete the game task in the first state being greater than a time consumed by the first target object to complete the game task in the second state. In one implementation, in the second state, a virtual vehicle may be instructed to increase advancing power, and/or decrease friction of the virtual vehicle. In another implementation, a "time" may be referred as a "time duration".

In another implementation, the step S306 may alternatively include adjusting, by the device based on the state adjustment instruction, the movement state of the first target object from a first state to a second state, a first time duration consumed by the first target object in the first state to complete the game task being longer than a second time duration consumed by the first target object in the second state to complete the game task.

Optionally, in S308, the first target object is controlled to perform the game task in the second state.

The steps of the method shown in FIG. 3 are applicable to, but are not limited to, the network environment shown in FIG. 1, and completed through data exchange between the user equipment 102 and the server 112, and are also applicable to, but are not limited to, the user equipment 102 shown in FIG. 2, and completed by the user equipment 102 independently. The foregoing description is merely an example, which is not limited in this embodiment.

Optionally, in this embodiment, the object control method is applicable to, but is not limited to, a scenario of implementing automatic control over a target object controlled by a client of a game application to shorten a control time in a game task. For example, the game application may be, but is not limited to, a racing game application. The target object may be, but is not limited to, virtual objects such as virtual characters, virtual equipment, and virtual vehicles manipulated by players in the racing game application. The action combination may include, but is not limited to, performing a target action at least twice according to the same direction (which may also be referred to as a "double-drift" below) by the target object during passing through a bend set in the game task. For example, a drift-to-the-left action is performed at least twice or a drift-to-the-right action is performed at least twice. The foregoing description is merely an example, which is not limited in this embodiment.

For example, it is assumed that the game application is a racing game application. In a case of detecting that a target angle generated in a process that a virtual vehicle controlled by a client performs two drift actions to the left reaches a trigger threshold, a state adjustment instruction used for adjusting a movement state of the virtual vehicle is automatically triggered, and the movement state of the virtual vehicle is adjusted from a first state to a second state in response to the state adjustment instruction, to control the virtual vehicle to perform a game task in the second state, to shorten a time consumed by the virtual vehicle in the game task and improve a win rate of the virtual vehicle in the racing game task. This is not limited in this embodiment.

In a process that the first target object controlled by the client performs the round of game task, in a case of detecting that the target angle generated in the process that the first target object performs the action combination reaches the trigger threshold, the state adjustment instruction used for adjusting the movement state of the first target object is triggered, so that the first target object adjusts the movement state from the first state to the second state, and performs the game task in the second state rather than in the first state. In this way, an objective of shortening a time of control over the first target object in the game task is achieved, and the first target object can complete the game task as soon as possible, thereby improving a win rate in the game task and further overcoming a problem that the control time is increased due to relatively high operation complexity in the related art.

Optionally, in this embodiment, the action combination may include, but is not limited to, performing a target action at least twice by the first target object during passing through a special bend set in the game task. The special bend may include, but is not limited to, a bend of which a turning angle is greater than a target angle threshold, such as a U-shaped bend.

Figure 4:
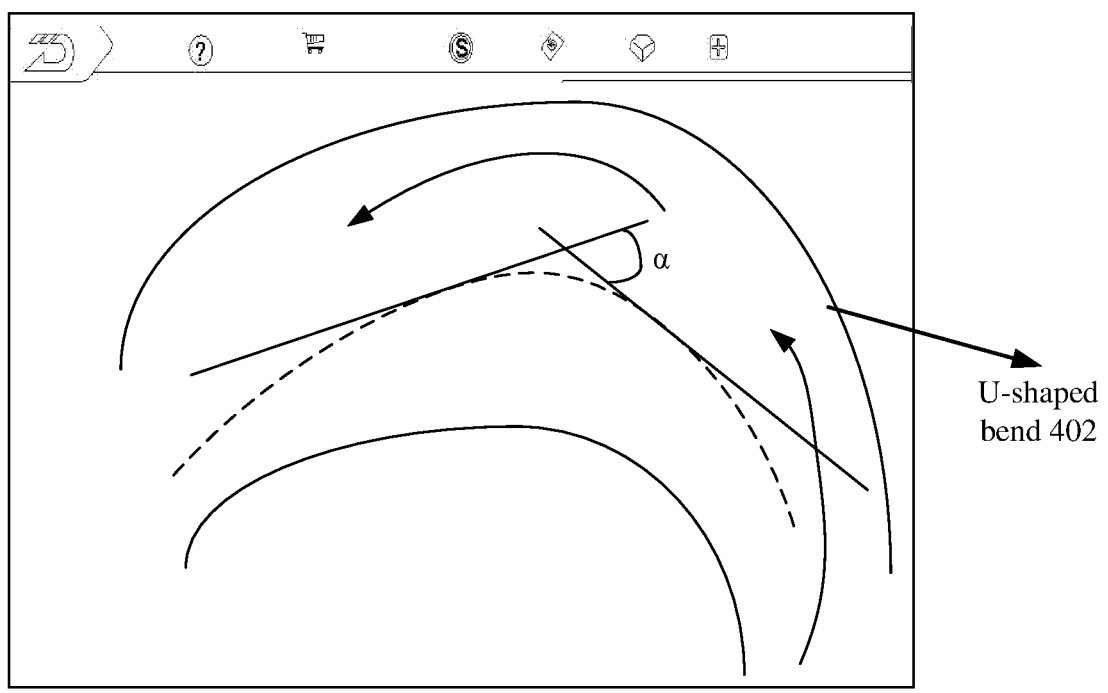
FIG. 4 is a schematic diagram of an optional object control method according to an embodiment of this application.

For example, a U-shaped bend 402 shown in FIG. 4 is set in a track of a game task, a bend angle α of the U-shaped bend 402 is greater than a specific angle threshold β, and the action combination may include, but is not limited to, an action combination including controlling the first target object to continuously perform a drift action of drifting to the left (as shown in FIG. 4, two curves with arrows are each used for indicating that the drift action is performed once). Further, according to the method provided in this embodiment, in a process that the first target object continuously performs the drift action of drifting to the left, it is detected whether a generated target angle (for example, a drift angle) reaches the trigger threshold, and in a case that the trigger threshold is reached, the state adjustment instruction is automatically triggered, to adjust the first target object from the first state to the second state that consumes less time.

Optionally, in this embodiment, the movement state may be used for, but is not limited to, indicating a stress state of acting force the first target object suffers in a moving process. The acting force includes advancing power for driving the first target object to move forward, and/or friction for preventing the first target object from moving forward. That is, an objective of adjusting a control time required for controlling the first target object to perform a game task is achieved by adjusting the acting force the first target object suffers. For example, the advancing power to the first target object is increased, and/or the friction to the first target object is decreased, so that the first target object can finish a game track set in a round of game task more quickly.

Optionally, in this embodiment, the controlling the first target object to perform the game task in the second state may include, but is not limited to, controlling the first target object to continue to perform the game task within a target time period in the second state. For example, a virtual vehicle in a racing game application performs a round of racing task. It is assumed that a plurality of bends are set in a racing track corresponding to the round of racing task, and the plurality of bends include a U-shaped bend. A drift angle generated in a process that the virtual vehicle performs two drift actions during passing through the U-shaped bend is detected. In a case of detecting that the drift angle reaches a trigger threshold, a state adjustment instruction is automatically triggered, to adjust a movement state of the virtual vehicle to a second state. For example, the second state is used for instructing to increase advancing power to the virtual vehicle, and/or decrease friction to the virtual vehicle. Further, in response to the state adjustment instruction, the virtual vehicle is controlled within a target time period to continue to travel in the racing track in the second state. For example, if the state adjustment instruction is triggered at a moment t1, the virtual vehicle is controlled to continue to travel in the second state until a moment t2. The foregoing description is merely an example, which is not limited in this embodiment.

Figure 5:
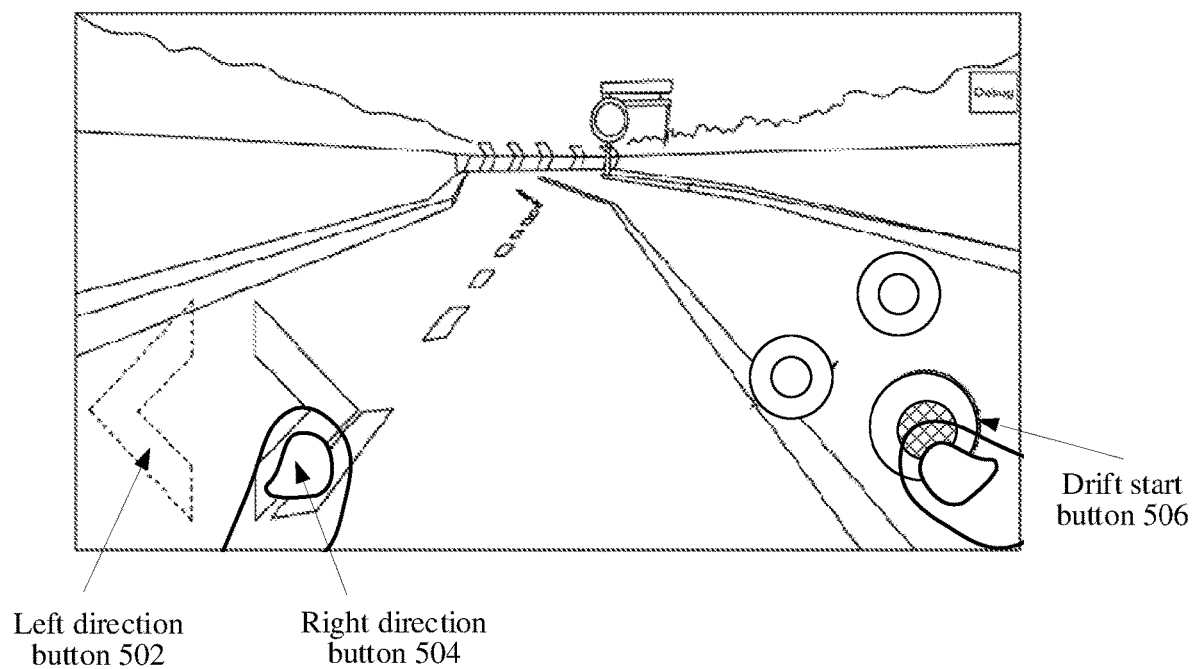
FIG. 5 is a schematic diagram of another optional object control method according to an embodiment of this application.

Optionally, in this embodiment, the target action in the action combination may be, but is not limited to, implemented by a control button displayed in a human-computer interaction interface of the client. The control button may include, but is not limited to, a first control button configured to control an advancing direction of the first target object, and a second control button configured to trigger the first target object to perform the target action. In a case that a touch and hold operation is performed on the first control button and the second control button simultaneously, the target object is triggered to perform the target action once. The first control button may be, but is not limited to, direction control buttons shown in FIG. 5, such as a "left direction button" 502 and a "right direction button" 504. The second control button may be, but is not limited to, a trigger control button shown in FIG. 5, such as a "drift start button" 506.

Figure 6:
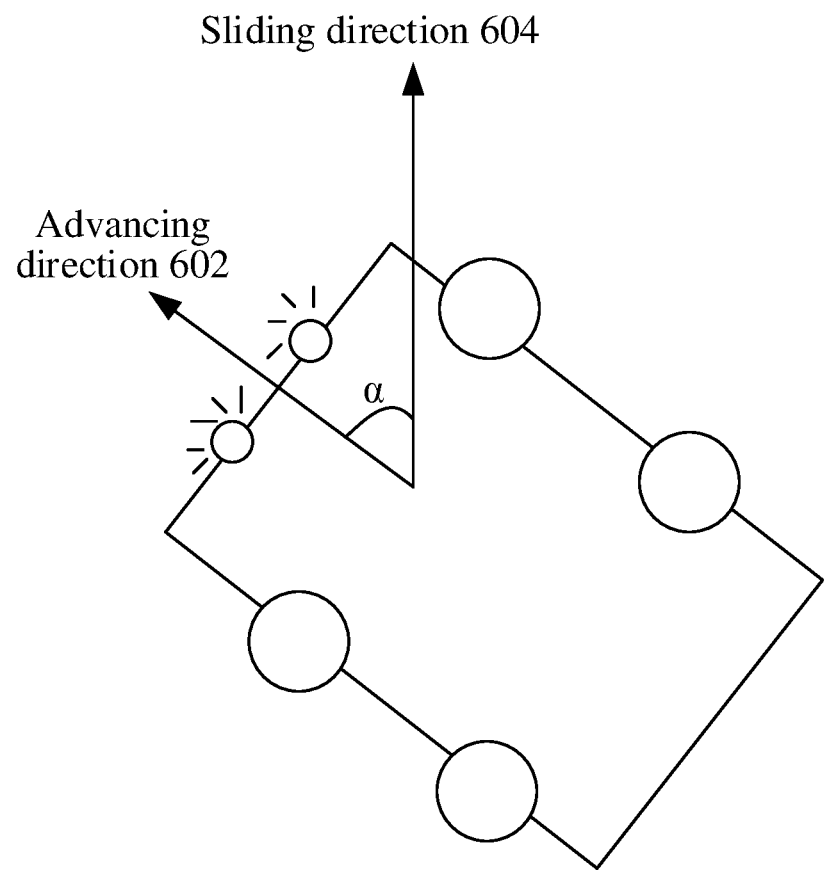
FIG. 6 is a schematic diagram of still another optional object control method according to an embodiment of this application.

Moreover, in this embodiment, the target angle may be, but is not limited to, an angle between an advancing direction and a sliding direction of the first target object. The sliding direction may be, but is not limited to, a direction to which the first target object actually moves in a process of performing the target action. FIG. 6 shows an advancing direction 602 and a sliding direction 604 when the first target object drifts to the left, and an angle between the two directions is a target angle α. The foregoing description is merely an example, which is not limited in this embodiment.

Figure 7:
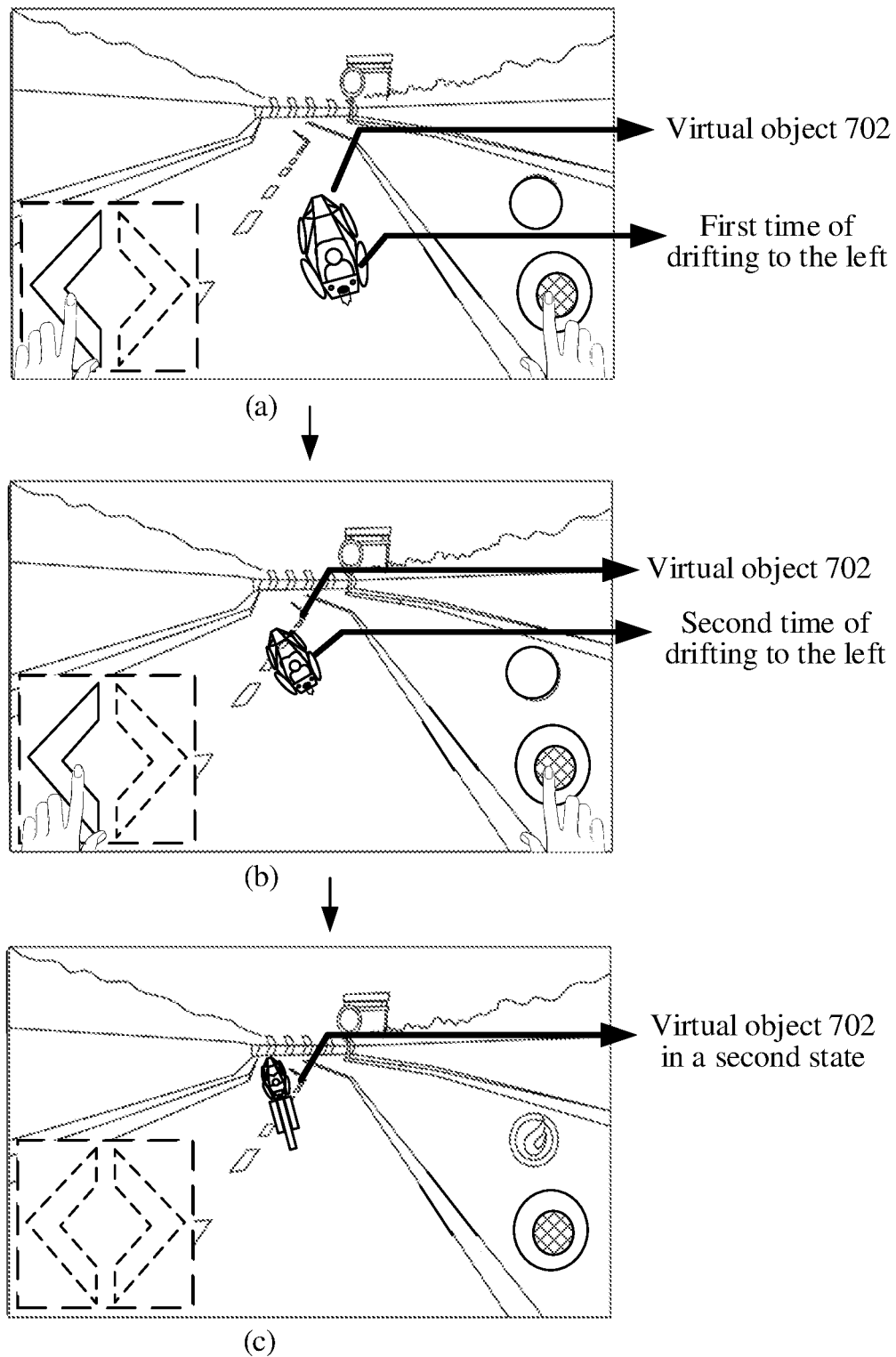
FIG. 7 is a schematic diagram of still another optional object control method according to an embodiment of this application.
Figure 8:
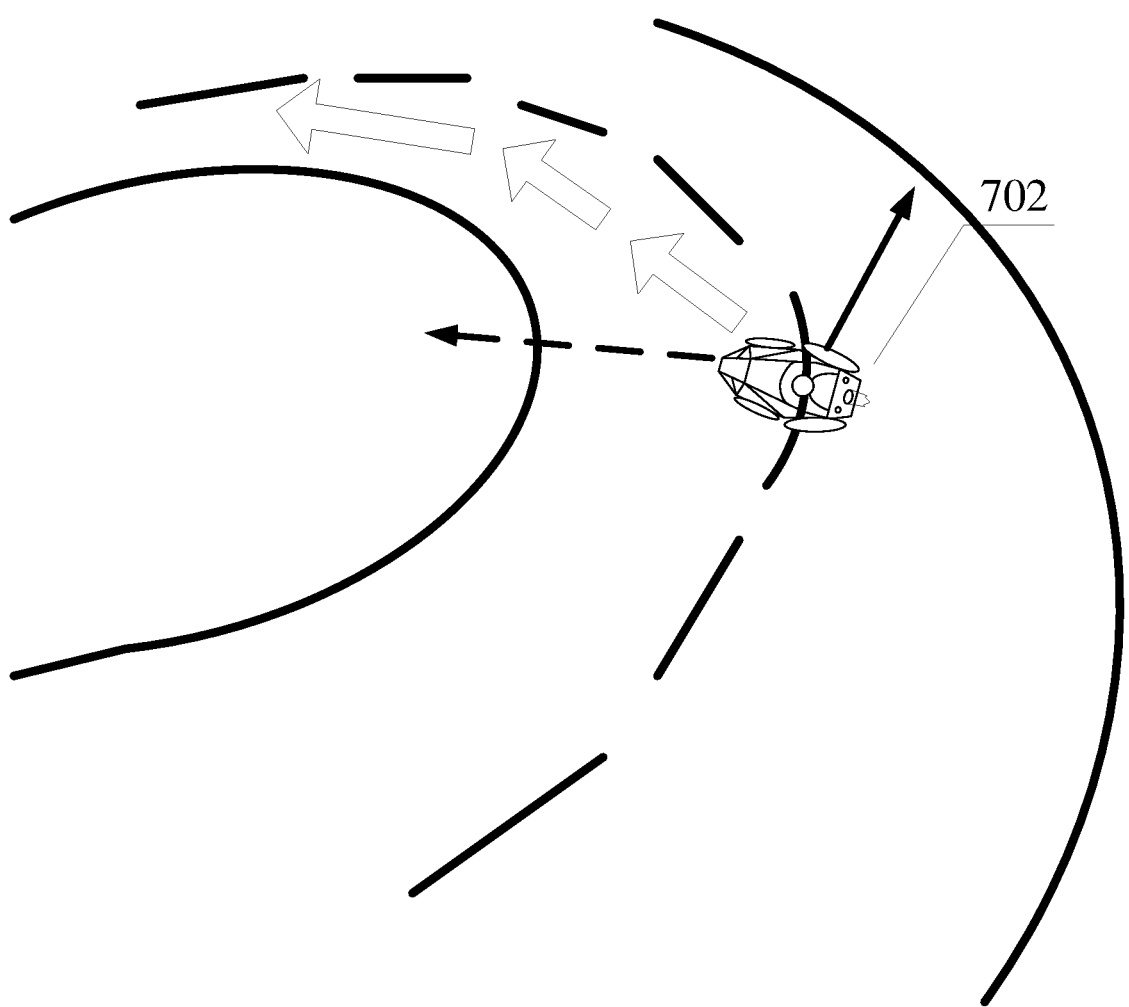
FIG. 8 is a schematic diagram of still another optional object control method according to an embodiment of this application.

Specifically, description is provided with reference to examples shown in FIG. 7 and FIG. 8.

A racing game application is still used as an example. It is assumed that in a process that the first target object (a virtual object 702 shown in the figure) controlled by the client performs a round of game task, as shown in FIG. 7(a), it is detected that a player performs a first touch and hold operation on a "left direction button" and a "drift start button" in a human-computer interaction interface, to control the virtual object 702 to performs a first time of drifting to the left. Then, as shown in FIG. 7(b), it is detected that after the player releases both of the control buttons, the play further performs a second touch and hold operation on the "left direction button" and the "drift start button" in the human-computer interaction interface, to control the virtual object 702 to perform a second time of drifting to the left. In this case, a target angle between an advancing direction and a sliding direction of the virtual object in the drift process of drifting to the left continuously is detected. In a case of detecting that the target angle reaches a trigger threshold, a state adjustment instruction is automatically triggered, to adjust a movement state of the virtual object 702 from a first state to a second state, and as shown in FIG. 7(c), control the virtual object 702 to perform a racing task in the second state (for example, FIG. 7 shows an accelerated state after advancing power is increased).

Further, a detection process may be shown in FIG. 8. In the drift process of drifting to the left continuously, the virtual object 702 moves forward along a direction of a dashed arrow but slides along a direction of a solid arrow. A target angle α between the two directions is detected. In a case that the target angle α reaches the trigger threshold, an adjustment process of the movement state of the virtual object 702 is automatically triggered.

Figure 9:
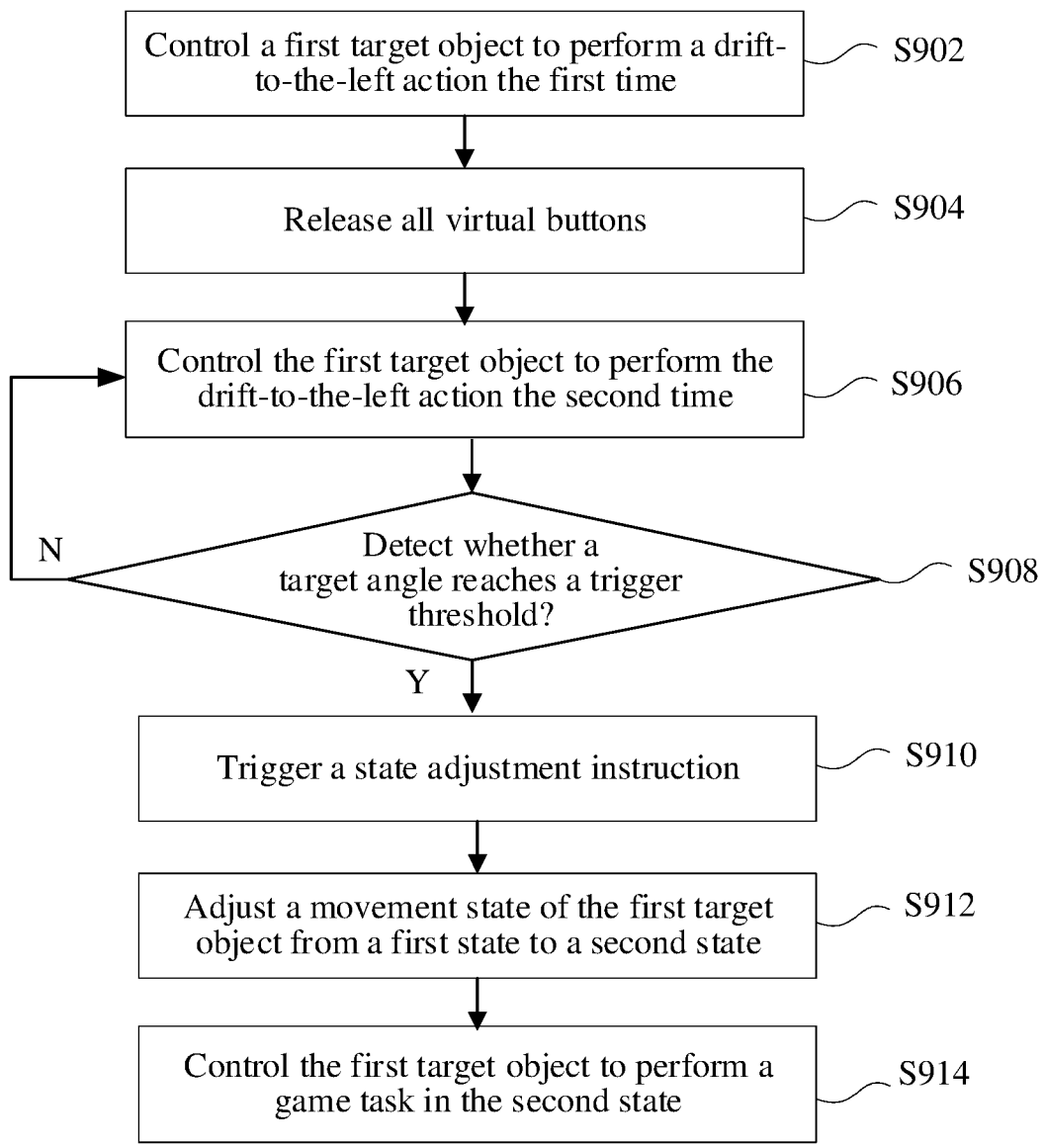
FIG. 9 is a flowchart of another optional object control method according to an embodiment of this application.

In addition, assuming that the performing an action combination once in this embodiment includes performing a drift-to-the-left action twice, a procedure of control logic of the object control method may include, but is not limited to, the following steps shown in FIG. 9:

In S902 to S906, a first operation instruction generated by performing a touch and hold operation on a left direction button and a drift start button in a human-computer interaction interface is detected, and the first target object is controlled to perform the drift-to-the-left action the first time in response to the first operation instruction. After both of the control buttons are released, a second operation instruction generated by performing the touch and hold operation on the left direction button and the drift start button in the human-computer interaction interface again is detected, and the first target object is controlled to perform the drift-to-the-left action the second time in response to the second operation instruction. Further, in S908, it is detected whether a target angle generated in the foregoing process reaches a trigger threshold, and in a case of detecting that the target angle does not reach the trigger threshold, S906 is still performed to continue to control the first target object to perform the drift action and the target angle is detected. In a case of detecting that the target angle reaches the trigger threshold, the following S910 to S914 are performed: A state adjustment instruction is triggered to adjust the movement state of the first target object from a first state to a second state, and the first target object is controlled to perform the game task in the second state.

According to the embodiments provided in this application, in a case of detecting that the target angle generated in the process that the first target object performs the action combination reaches the trigger threshold, the state adjustment instruction used for adjusting the movement state of the first target object is automatically triggered, so that the first target object adjusts the movement state to the second state, and performs the game task in the second state rather than in the first state. In this way, an objective of shortening a time of control over the first target object in the game task is achieved, and the first target object can complete the game task as soon as possible, thereby improving a win rate in the game task and further overcoming a problem that the control time is increased due to relatively high operation complexity in the related art.

In an optional solution, the adjusting the movement state of the first target object from the first state to the second state in response to the state adjustment instruction includes:

S1, obtaining a first parameter value, the first parameter value being a value of acting force the first target object suffers in the first state; and S2, adjusting the first parameter value to a second parameter value, the second parameter value being a value of the acting force the first target object suffers in the second state.

In this embodiment, the acting force the first target object suffers in the game task may include, but is not limited to, at least one of the following: advancing power for driving the first target object to move forward, and friction for preventing the first target object from moving forward. Corresponding parameter values may include, but are not limited to, a power parameter value and a friction parameter value. The foregoing description is merely an example, which is not limited in this embodiment.

Figure 10:
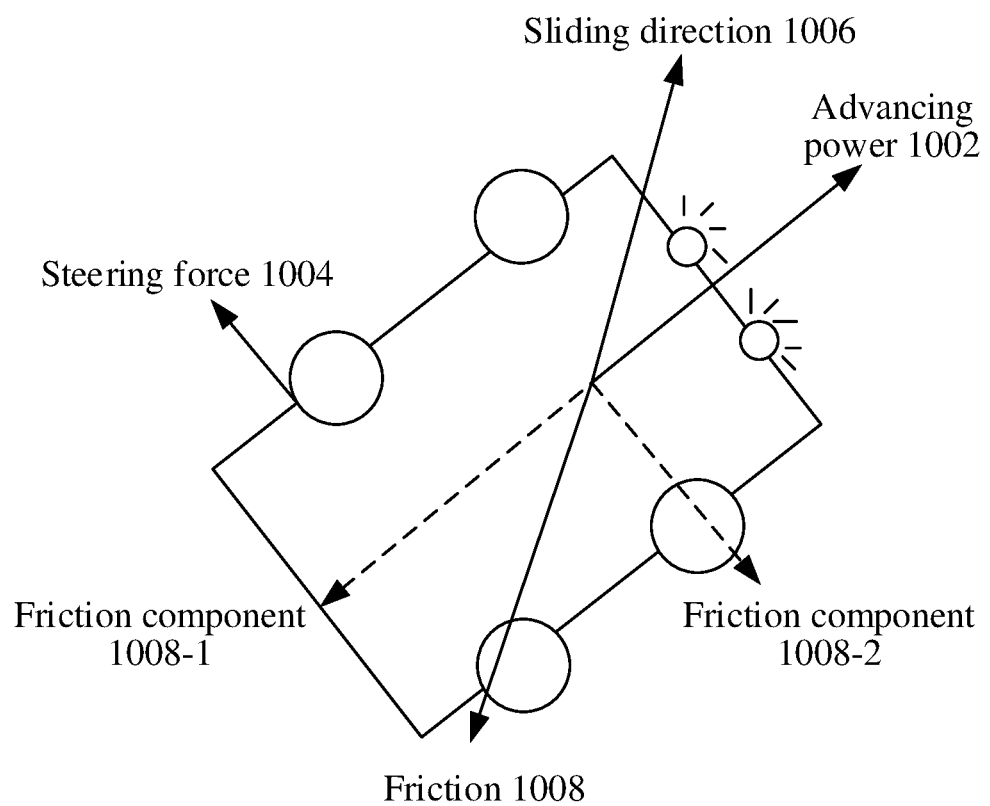
FIG. 10 is a schematic diagram of still another optional object control method according to an embodiment of this application.

For example, FIG. 10 shows stress analysis of the acting force the first target object suffers. The first target object travels forward as driven by the advancing power 1002, and slides to one side as driven by steering force 1004 generated by a drift action, and an actual moving direction of the first target object under the joint action of the two is a sliding direction 1006. Friction 1008 is generated in a traveling process of the first target object. Components of the friction 1008 in two directions may include: a friction component 1008-1 for preventing the first target object from moving forward, and a friction component 1008-2 for preventing the first target object from sliding.

Optionally, in this embodiment, adjusting a first parameter value to a second parameter value corresponding to the second state according to a target proportion includes at least one of the following:

1) in a case that the acting force includes advancing power, the first parameter value includes a first power parameter value, and the second parameter value includes a second power parameter value, increasing the first power parameter value to the second power parameter value according to a first target proportion; and 2) in a case that the acting force includes friction, the first parameter value includes a first friction parameter value, and the second parameter value includes a second friction parameter value, decreasing the first friction parameter value to the second friction parameter value according to a second target proportion.

That is, in this embodiment, the advancing power of the first target object may be increased, or the friction of the first target object may be decreased, or the advancing power of the first target object may be increased and the friction is decreased. In addition, the first target proportion for adjusting the advancing power and the second target proportion for adjusting the friction may be, but are not limited to, set to different values according to different actual scenes. The first target proportion may be equal to the second target proportion, or may be not equal to the second target proportion, and a relative magnitude relationship between the two target proportions is not limited in this embodiment.

In this embodiment, increasing the advancing power (power promotion) may be increasing an advancing acceleration for the first target object, so that a travel speed at which the first target object moves forward is higher, thereby reducing the time consumed by the first target object in the racing task.

In addition, the action combination may include, but is not limited to, the drift action. The first target object generally slides in a process of performing the drift action, which increases a probability of generating a collision error. Once a collision error occurs, the player generally needs to consume more time to adjust the first target object, to resume a normal racing task running process of the first target object. Therefore, in this embodiment, the friction may be further reduced, so that the first target object may turn more quickly in the process of performing the drift action, to shorten a turning time, thereby achieving an objective of shortening the time consumed by the first target object in the racing task. This application is not limited thereto. The second target proportion may be, but is not limited to, used for adjusting a friction coefficient, or may be, but is not limited to, used for adjusting a value of the friction.

Specifically, description is provided with reference to the following example.

It is assumed that the advancing power to the first target object is adjusted according to the first target proportion a %:

$$F_1 = F_0 * (1 + a\%),$$

where a % is the first target proportion and 0<a %<100%, $F_1$ is the second power parameter value, and $F_0$ is the first power parameter value.

It is assumed that the friction of the first target object is adjusted according to the second target proportion b %:

$$f_1 = f_0 * b\%,$$

where b % is the second target proportion and 0<b %<100%, f1 is the second friction parameter value, and f0 is the first friction parameter value. In another implementation, the friction of the first target object may be adjusted according to a formula of $f_1 = f_0 * (1 - b\%)$, where b % is the second target proportion and 0<b %<100%, f1 is the second friction parameter value, and f0 is the first friction parameter value.

According to the embodiments provided in this application, the parameter value corresponding to the acting force the first target object suffers is adjusted according to the target proportion, so that adjustment of the movement state of the first target object is automatically triggered by detecting the relationship between the target angle and the trigger threshold, and the first target object continues to perform the game task in the parameter value corresponding to the acting force indicated by the adjusted-to second state, thereby shortening the time of control over the first target object in the game task, and improving a win rate of the first target object in the racing game task.

In an optional solution, before the adjusting a first parameter value to a second parameter value corresponding to the second state according to a target proportion, the method further includes:

S1, determining a quantity of times that the target action is performed in the action combination; and S2, determining a target proportion according to the quantity, the target proportion being used for adjusting the first parameter value to the second parameter value. Optionally, the target proportion and the quantity may be positively correlated.

In this embodiment, the quantity of times of the target action included in the action combination may be, but is not limited to, greater than or equal to 2. With the increase of the quantity of times of the target action, the target proportion used for adjusting the parameter value may be correspondingly changed. This application is not limited thereto. A greater quantity of times that the target action is performed indicates higher difficulty in completing a current bend, and a value of the target proportion may be correspondingly increased, so that the first target object may pass through the complex bend as soon as possible. This application is not limited thereto.

For example, description is still made by using the example shown in FIG. 7. It is assumed that the virtual object 702 performs an action combination once, and the action combination includes performing a drift-to-the-left action twice. In a process that the drift-to-the-left action is performed the second time, in a case of detecting that a drift angle $\alpha$ reaches a trigger threshold (for example, the trigger threshold is 68°), the advancing power of the virtual object may be increased according to a proportion of 10%, and/or the friction of the virtual object may be decreased according to the proportion of 10%. This application is not limited thereto.

In another example, description is still made by using the example shown in FIG. 7. It is assumed that the virtual object 702 performs an action combination once, and the action combination includes performing a drift-to-the-left action three times. In a process that the drift-to-the-left action is performed the third time, in a case of detecting that a drift angle $\alpha$ reaches a trigger threshold (for example, the trigger threshold is 68°), the advancing power of the virtual object may be increased according to a proportion of 15%, and/or the friction of the virtual object may be decreased according to a proportion of 12%. This application is not limited thereto.

That is, with the increase of the quantity of times of the target action included in the action combination, the target proportion may be adjusted, and adjustment tendencies of the two factors may be positively correlated. However, a specific adjusted value of the target proportion is not limited in this embodiment.

According to the embodiments provided in this application, the target proportion used for adjusting the parameter value of the acting force is associated with the quantity of times that the target action is performed in the action combination, so that the target proportion may be adjusted based on the quantity of times that the target action is performed. Therefore, the first target object may be controlled more flexibly, and the flexibility of the target object in completing the game task is improved.

In an optional solution, the controlling the first target object to perform the game task in the second state includes:
   S1, determining a trigger moment of the state adjustment instruction; and
   S2, controlling the first target object to perform the game task in the second state from the trigger moment to a target moment, the target moment being determined according to an action difficulty coefficient in performing the action combination. In one implementation, a "moment" may be referred as a "time point".

The target moment may be, but is not limited to, determined according to the action difficulty coefficient of the action combination. The action difficulty coefficient may be, but is not limited to, determined according to at least one of the following parameters: the quantity of times of the target action included in the action combination, a bend angle of a bend to be passed through when the action combination is performed, and the like. In a case of a higher action difficulty coefficient, the target moment may be controlled to be later. This application is not limited thereto. That is, for a more difficult action combination, a time from the trigger moment to the target moment is controlled to be longer, so that the player has sufficient time for adjustment to pass through the current bend as soon as possible, to complete a game task in a current round of game as soon as possible.

Specifically, description is provided with reference to the following example.

Description is still made by using the example shown in FIG. 7. It is assumed that a moment at which the virtual object 702 performs the drift action the second time is t0, and a target angle detected at the moment t0 is 65°. In this case, an angle change brought by passive drifting after the drift action is performed the second time needs to be further detected. Further, it is assumed that the target angle exactly reaches the trigger threshold 68° at a moment t1. The moment t1 is then used as a trigger moment of the state adjustment instruction, and adjustment of the movement state of the first target object is controlled from the moment t1 and maintained until a target moment (for example, a moment t2). The controlling adjustment of the movement state of the first target object may include, but is not limited to, increasing the advancing power of the virtual object 702 by b %, and decreasing the friction of the virtual object 702 by b %.

According to the embodiments provided in this application, the first target object is controlled to perform the game task in the second state between the trigger moment and the target moment, to ensure fairness of running of the game task. In addition, the target moment is determined according to the action difficulty coefficient of the action combination, and the flexibility in controlling the first target object is further improved.

In an optional solution, in addition to the first target object, a second target object is further in the game task. Correspondingly, the controlling the first target object to perform the game task in the second state includes:
   S1, in a case that the first target object is in the second state and it is detected that the first target object collides with the second target object, controlling the first target object to generate first collision force to the second target object, the first collision force being greater than second collision force, and the second collision force being collision force generated in a case that the first target object is in the first state and collides with the second target object.

Optionally, in this embodiment, collision force between the first target object and another target object in the game task may be further changed by adjusting the movement state of the first target object to the second state. That is, in a case of detecting that the first target object collides with the second target object in the game task, the first target object in the second state has greater collision force to knock away the second target object that stands in the way ahead than the first target object in the first state, so that the second target object moves to a target position. The target position may be, but is not limited to, determined according to a collision point, a collision direction, and the collision force jointly. In this way, the second target object in the game task may move to another position that does not belong to the current track after the collision, and no longer block the first target object in the current track from passing through quickly.

A travel speed of the first target object in the second state is greatly improved within a short time. Based on the principle of momentum conservation, in a case that mass of the target object is unchanged, the improved travel speed within a short time is equal to providing relatively great impact force (that is, collision force) for the first target object. In this way, in a bend with a narrow space, the first target object may be assisted in passing through the bend quickly, and in a case that a second target object stands in the way ahead, the greater collision force generated in the second state may be further utilized to confront the second target object and knock the second target object away.

According to the embodiments provided in this application, in a case that the first target object is in the second state and it is detected that the first target object collides with a second target object in the game task, the first target object is controlled to generate first collision force to the second target object, to knock away the second target object that blocks the first target object from completing the game task. Therefore, the first target object may continue to complete the game task in the given track, to avoid a problem of wasting time since the first target object moves out of the track due to the collision.

In an optional solution, a human-computer interaction interface displayed by the client includes a first control button and a second control button. Before the detecting a target angle generated in a process that the first target object performs an action combination once, the method further includes:

S1, obtaining an operation instruction generated by performing a touch and hold operation on the first control button and the second control button, the first control button being configured to adjust the advancing direction of the first target object, and the second control button being configured to trigger the first target object to perform the target action; and S2, controlling the first target object to perform the target action at least twice in response to the operation instruction.

Optionally, in this embodiment, the first control button may be, but is not limited to, direction buttons including a left direction button and a right direction button. The second control button may be, but is not limited to, a drift start button for triggering a drift action. In a case that a touch and hold operation is performed on the first control button and the second control button simultaneously, an operation instruction is generated. The operation instruction is used for instructing a target object to perform a target action, such as a drift action. In this embodiment, the performing the target action at least twice in the action combination may be, but is not limited to, continuously performing the drift action according to the same direction. For example, the action combination may be: touching and holding the left direction button and the drift start button to trigger a drift-to-the-left action the first time, and then releasing both of the control buttons; next, touching and holding the left direction button and the drift start button again, to trigger the drift-to-the-left action the second time; and so on.

According to the embodiments provided in this application, the action combination is implemented by performing operations on the first control button and the second control button, and in a case of detecting that the target angle generated in the process that the first target object performs the action combination reaches the trigger threshold, the state adjustment instruction is automatically triggered, to adjust the movement state of the first target object, so that the first target object may continue to perform the game task in the adjusted-to second state, thereby achieving an objective of shortening a time consumed in the game task and improving a win rate of the first target object in a round of game.

For ease of description, the foregoing method embodiments are stated as a combination of a series of actions. However, a person skilled in the art is to know that this application is not limited to the described action sequence, because according to this application, some steps may be performed in another sequence or simultaneously. In addition, a person skilled in the art is also to understand that the embodiments described in this specification are all exemplary embodiments, and the involved actions and modules are not necessarily required by this application.

Figure 11:
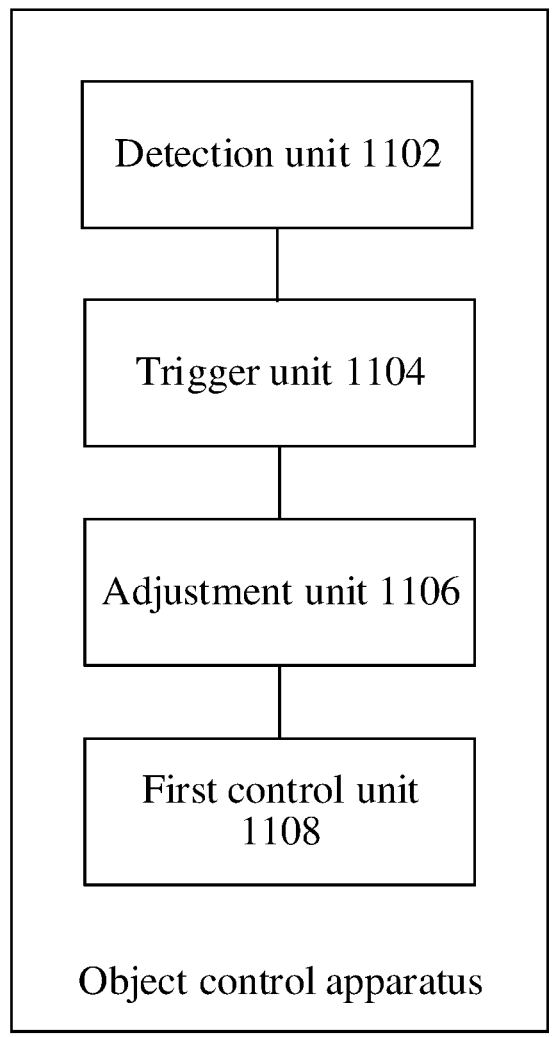
FIG. 11 is a schematic structural diagram of an optional object control apparatus according to an embodiment of this application.

According to another aspect of the embodiments of this application, an object control apparatus for implementing the object control method is further provided. As shown in FIG. 11, the apparatus includes:

1) a detection unit 1102, configured to detect, in a process that a first target object controlled by a client performs a round of game task, a target angle generated in a process that the first target object performs an action combination once, the action combination including performing a target action at least twice according to the same direction, and the target angle being an angle between an advancing direction and a sliding direction of the first target object;

2) a trigger unit 1104, configured to trigger a state adjustment instruction in a case that the target angle reaches a trigger threshold, the state adjustment instruction being used for instructing to adjust a movement state of the first target object;

3) an adjustment unit 1106, configured to adjust the movement state of the first target object from a first state to a second state in response to the state adjustment instruction, a time consumed by the first target object to complete the game task in the first state being greater than a time consumed by the first target object to complete the game task in the second state; and 4) optionally, a first control unit 1108, configured to control the first target object to perform the game task in the second state.

The apparatus shown in FIG. 11 is applicable to, but is not limited to, the user equipment 102 and the server 112 in the network environment shown in FIG. 1, and is also applicable to, but is not limited to, the user equipment 102 shown in FIG. 2. The foregoing description is merely an example, which is not limited in this embodiment.

Optionally, in this embodiment, the object control apparatus is applicable to, but is not limited to, a scenario of implementing automatic control over a target object controlled by a client of a game application to shorten a control time in a game task. For example, the game application may be, but is not limited to, a racing game application. The target object may be, but is not limited to, virtual objects such as virtual characters, virtual equipment, and virtual vehicles manipulated by players in the racing game application. The action combination may include, but is not limited to, performing a target action at least twice according to the same direction (which may also be referred to as a "double-drift" below) by the target object during passing through a bend set in the game task. For example, a drift-to-the-left action is performed at least twice or a drift-to-the-right action is performed at least twice. The foregoing description is merely an example, which is not limited in this embodiment.

For example, it is assumed that the game application is a racing game application. In a case of detecting that a target angle generated in a process that a virtual vehicle controlled by a client performs two drift actions to the left reaches a trigger threshold, a state adjustment instruction used for adjusting a movement state of the virtual vehicle is automatically triggered, and the movement state of the virtual vehicle is adjusted from a first state to a second state in response to the state adjustment instruction, to control the virtual vehicle to perform a game task in the second state, to shorten a time consumed by the virtual vehicle in the game task and improve a win rate of the virtual vehicle in the racing game task. This is not limited in this embodiment.

In a case of detecting that the target angle generated in the process that the first target object performs the action combination reaches the trigger threshold, the state adjustment instruction used for adjusting the movement state of the first target object is automatically triggered, so that the first target object adjusts the movement state to the second state, and performs the game task in the second state rather than in the first state. In this way, an objective of shortening a time of control over the first target object in the game task is achieved, and the first target object can complete the game task as soon as possible, thereby improving a win rate in the game task and further overcoming a problem that the control time is increased due to relatively high operation complexity in the related art.

In an optional solution, the adjustment unit 1106 includes:
1) an obtaining module, configured to obtain a first parameter value, the first parameter value being a value of acting force the first target object suffers in the first state; and
2) an adjustment module, configured to adjust the first parameter value to a second parameter value, the second parameter value being a value of the acting force the first target object suffers in the second state.

In this embodiment, the acting force the first target object suffers in the game task may include, but is not limited to, at least one of the following: advancing power for driving the first target object to move forward, and friction for preventing the first target object from moving forward. Corresponding parameter values may include, but are not limited to, a power parameter value and a friction parameter value. The foregoing description is merely an example, which is not limited in this embodiment.

Optionally, in this embodiment, the adjustment module includes at least one of the following:
(1) a first adjustment submodule, configured to: in a case that the acting force includes advancing power, the first parameter value includes a first power parameter value, and the second parameter value includes a second power parameter value, increase the first power parameter value to the second power parameter value according to a first target proportion; and
(2) a second adjustment submodule, configured to: in a case that the acting force includes friction, the first parameter value includes a first friction parameter value, and the second parameter value includes a second friction parameter value, decrease the first friction parameter value to the second friction parameter value according to a second target proportion.

In an optional solution, the apparatus further includes:
(1) a first determining module, configured to determine a quantity of times that the target action is performed in the action combination; and
(2) a second determining module, configured to determine a target proportion according to the quantity, the target proportion being used for adjusting the first parameter value to the second parameter value.

According to the embodiments provided in this application, the parameter value corresponding to the acting force the first target object suffers is adjusted according to the target proportion, so that adjustment of the movement state of the first target object is automatically triggered by detecting the relationship between the target angle and the trigger threshold, and the first target object continues to perform the game task in the parameter value corresponding to the acting force indicated by the adjusted-to second state, thereby shortening the time of control over the first target object in the game task, and improving a win rate of the first target object in the racing game task.

In an optional solution, the first control unit 1108 includes:
1) a third determining module, configured to determine a trigger moment of the state adjustment instruction; and
2) a first control module, configured to control the first target object to perform the game task in the second state from the trigger moment to a target moment, the target moment being determined according to an action difficulty coefficient in performing the action combination.

That is, with the increase of the quantity of times of the target action included in the action combination, the target proportion may be adjusted, and adjustment tendencies of the two factors are positively correlated. However, a specific adjusted value of the target proportion is not limited in this embodiment.

According to the embodiments provided in this application, the target proportion used for adjusting the parameter value of the acting force is associated with the quantity of times that the target action is performed in the action combination, so that the target proportion may be adjusted based on the quantity of times that the target action is performed. Therefore, the first target object may be controlled more flexibly, and the flexibility of the target object in completing the game task is improved.

In an optional solution, a second target object is in the game task, and the first control unit 1108 includes:
1) a second control module, configured to: in a case that the first target object is in the second state and it is detected that the first target object collides with the second target object, control the first target object to generate first collision force to the second target object, the first collision force being greater than second collision force, and the second collision force being collision force generated in a case that the first target object is in the first state and collides with the second target object.

Optionally, in this embodiment, collision force between the first target object and another target object in the game task may be further changed by adjusting the movement state of the first target object to the second state. That is, in a case of detecting that the first target object collides with the second target object in the game task, the first target object in the second state has greater collision force to knock away the second target object that stands in the way ahead than the first target object in the first state, so that the second target object moves to a target position. The target position may be, but is not limited to, determined according to a collision point, a collision direction, and the collision force jointly. In this way, the second target object in the game task may move to another position that does not belong to the current track after the collision, and no longer block the first target object in the current track from passing through quickly.

According to the embodiments provided in this application, in a case that the first target object is in the second state and it is detected that the first target object collides with a second target object in the game task, the first target object is controlled to generate first collision force to the second target object, to knock away the second target object that blocks the first target object from completing the game task. Therefore, the first target object may continue to complete the game task in the given track, to avoid a problem of wasting time since the first target object moves out of the track due to the collision.

In an optional solution, a human-computer interaction interface displayed by the client includes a first control button and a second control button. The apparatus further includes:

1) an obtaining unit, configured to obtain an operation instruction generated by performing a touch and hold operation on the first control button and the second control button, the first control button being configured to adjust the advancing direction of the first target object, and the second control button being configured to trigger the first target object to perform the target action; and 2) a second control unit, configured to control the first target object to perform the target action at least twice in response to the operation instruction.

Optionally, in this embodiment, the first control button may be, but is not limited to, direction buttons including a left direction button and a right direction button. The second control button may be, but is not limited to, a drift start button for triggering a drift action. In a case that a touch and hold operation is performed on the first control button and the second control button simultaneously, an operation instruction is generated. The operation instruction is used for instructing a target object to perform a target action, such as a drift action. In this embodiment, the performing the target action at least twice in the action combination may be, but is not limited to, continuously performing a drift action according to the same direction. For example, the action combination may be: touching and holding the left direction button and the drift start button to trigger a drift-to-the-left action the first time, and then releasing both of the control buttons; next, touching and holding the left direction button and the drift start button again, to trigger the drift-to-the-left action the second time; and so on.

According to the embodiments provided in this application, the action combination is implemented by performing operations on the first control button and the second control button, and in a case of detecting that the target angle generated in the process that the first target object performs the action combination reaches the trigger threshold, the state adjustment instruction is automatically triggered, to adjust the movement state of the first target object, so that the first target object may continue to perform the game task in the adjusted-to second state, thereby achieving an objective of shortening a time consumed in the game task and improving a win rate of the first target object in a round of game.

Figure 12:
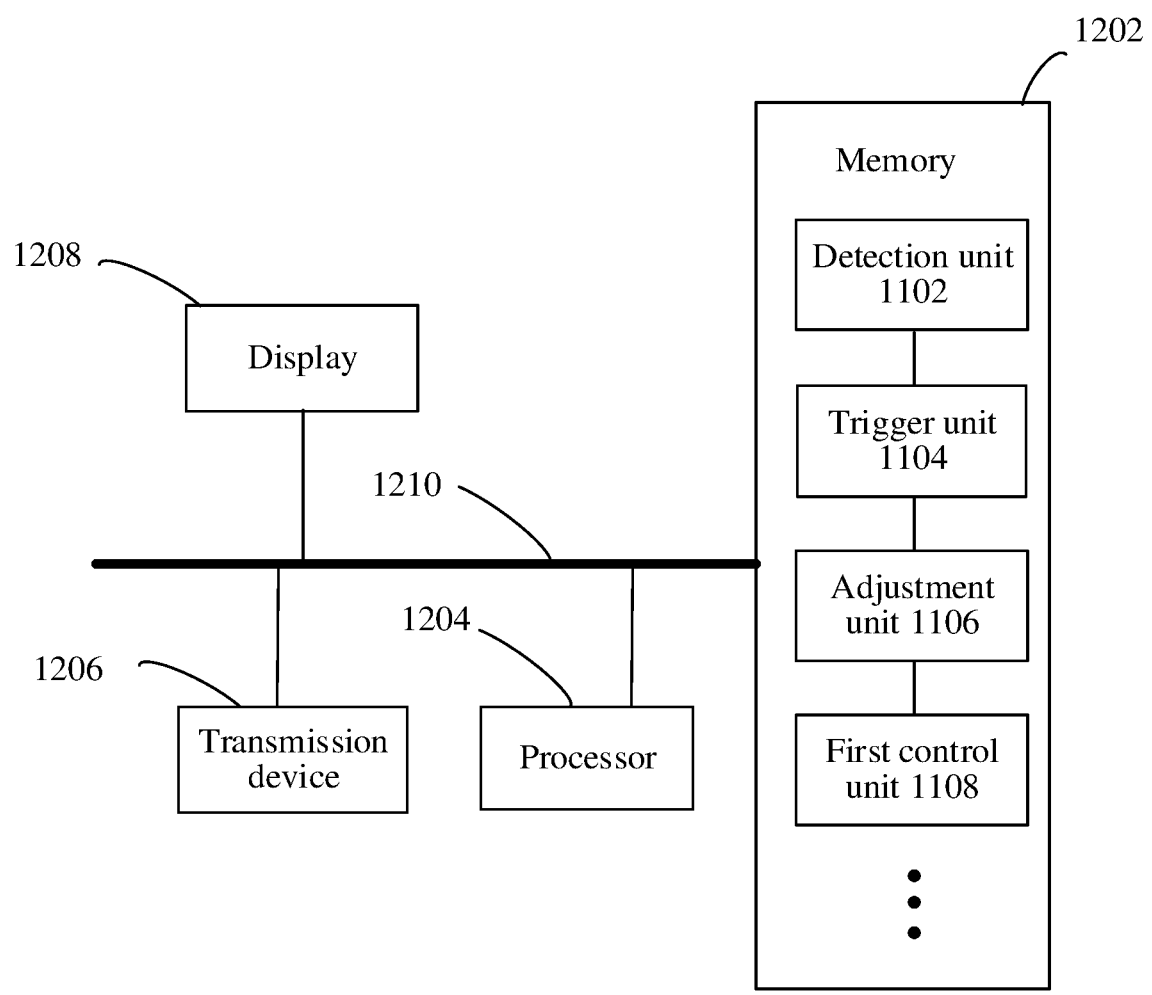
FIG. 12 is a schematic structural diagram of an optional electronic device according to an embodiment of this application.

According to still another aspect of the embodiments of this application, an electronic device for implementing the object control method is further provided. As shown in FIG. 12, the electronic device includes a memory 1202 and a processor 1204. The memory 1202 stores a computer program, and the processor 1204 is configured to perform steps in any one of the above method embodiments by using the computer program.

Optionally, in this embodiment, the electronic device may be located in at least one of a plurality of network devices in a computer network.

Optionally, in this embodiment, the processor may be configured to perform the following steps by using the computer program:

S1, detecting, in a process that a first target object controlled by a client performs a round of game task, a target angle generated in a process that the first target object performs an action combination once, the action combination including performing a target action at least twice according to the same direction, and the target angle being an angle between an advancing direction and a sliding direction of the first target object;

S2, triggering a state adjustment instruction in a case that the target angle reaches a trigger threshold, the state adjustment instruction being used for instructing to adjust a movement state of the first target object; and S3, adjusting the movement state of the first target object from a first state to a second state in response to the state adjustment instruction, a time consumed by the first target object to complete the game task in the first state being greater than a time consumed by the first target object to complete the game task in the second state.

Optionally, a person of ordinary skill in the art may understand that, the structure shown in FIG. 12 is only illustrative. The electronic device may also be a terminal device such as a smartphone (such as an Android mobile phone or an iOS mobile phone), a tablet computer, a palmtop computer, a mobile Internet device (MID), or a PAD. FIG. 12 does not constitute a limitation on the structure of the electronic device. For example, the electronic device may further include more or fewer components (such as a network interface) than those shown in FIG. 12, or have a configuration different from that shown in FIG. 12.

The memory 1202 may be configured to store a software program and a module, for example, a program instruction/module corresponding to the object control method and apparatus in the embodiments of this application, and the processor 1204 performs various functional applications and data processing by running the software program and the module stored in the memory 1202, that is, implementing the foregoing object control method. The memory 1202 may include a high-speed random memory, and may also include a non-volatile memory, for example, one or more magnetic storage apparatuses, a flash memory, or another nonvolatile solid-state memory. In some embodiments, the memory 1202 may further include memories remotely disposed relative to the processor 1204, and the remote memories may be connected to a terminal through a network. Examples of the network include, but are not limited to, the Internet, an intranet, a local area network, a mobile communication network, and a combination thereof. The memory 1202 may be specifically configured to, but is not limited to, store the state adjustment instruction, and attribute information related to the first target object, such as state information. In an example, as shown in FIG. 12, the memory 1202 may include, but is not limited to, the detection unit 1102, the trigger unit 1104, the adjustment unit 1106, and the first control unit 1108 in the object control apparatus. In addition, the memory may also include, but is not limited to, other modules and units in the object control apparatus, which will not be elaborated in this example.

Optionally, a transmission device 1206 is configured to receive or transmit data through a network. Specific examples of the foregoing network may include a wired network and a wireless network. In an example, the transmission device 1206 includes a network interface controller (NIC). The NIC may be connected to another network device and a router by using a network cable, so as to communicate with the Internet or a local area network. In an example, the transmission device 1206 is a radio frequency (RF) module, which communicates with the Internet in a wireless manner.

In addition, the electronic device further includes: a display 1208, configured to display the first target object and a process that the first target object performs a game task;

and a connection bus 1210, configured to connect various modules and components in the electronic device.

According to still another aspect of the embodiments of this application, a storage medium is further provided, the storage medium storing a computer program, the computer program being configured to perform, when run, steps in any one of the foregoing method embodiments.

Optionally, in this embodiment, the storage medium may be configured to store a computer program for performing the following steps:

S1, detecting, in a process that a first target object controlled by a client performs a round of game task, a target angle generated in a process that the first target object performs an action combination once, the action combination including performing a target action at least twice according to the same direction, and the target angle being an angle between an advancing direction and a sliding direction of the first target object;

S2, triggering a state adjustment instruction in a case that the target angle reaches a trigger threshold, the state adjustment instruction being used for instructing to adjust a movement state of the first target object; and S3, adjusting the movement state of the first target object from a first state to a second state in response to the state adjustment instruction, a time consumed by the first target object to complete the game task in the first state being greater than a time consumed by the first target object to complete the game task in the second state.

Optionally, in this embodiment, a person of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a read-only memory (ROM), a random access memory (RAM), a magnetic disk, an optical disk, and the like.

An embodiment of this application further provides a computer program product including instructions, the instructions, when run on a computer, causing the computer to perform the method according to the foregoing embodiments.

The sequence numbers of the foregoing embodiments of this application are merely for description purpose but do not imply the preference among the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions of this application essentially, or a part contributing to the related art, or all or a part of the technical solution may be implemented in a form of a software product. The computer software product is stored in a storage medium and includes several instructions for instructing one or more computer devices (which may be a PC, a server, a network device or the like) to perform all or some of steps of the methods in the embodiments of this application.

In the foregoing embodiments of this application, the descriptions of the embodiments have respective focuses. For a part that is not described in detail in an embodiment, refer to related descriptions in other embodiments.

In the several embodiments provided in this application, it is to be understood that, the disclosed client may be implemented in another manner. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the coupling, or direct coupling, or communication connection between the displayed or discussed components may be the indirect coupling or communication connection by means of some interfaces, units, or modules, and may be electrical or of other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of this application may be integrated into one processing unit, or each of the units may be physically separated, or two or more units may be integrated into one unit. The integrated unit may be implemented in the form of hardware, or may be implemented in a form of a software functional unit.

The foregoing descriptions are merely exemplary implementations of this application. A person of ordinary skill in the art may further make several improvements and modifications without departing from the principle of this application, and the improvements and modifications are also considered as falling within the protection scope of this application.

What is claimed is:

1. A method for controlling an object, the method comprising:
    detecting, by a device comprising a memory storing instructions and a processor in communication with the memory, a second slip angle caused by a first target action and a second target action performed by a first target object, wherein
        the first target action causes the first target object to enter a first drifting state with a first slip angle, and
        the second target action performed during the first drifting state increases the first slip angle to the second slip angle, and wherein
        the first and second slip angles are angles between an advancing direction and a sliding direction of the first target object; and
    triggering, by the device, a state adjustment instruction in response to the second slip angle reaching a trigger threshold, the state adjustment instruction adjusting a movement state of the first target object from the first drifting state to a second drifting state, a first time duration consumed by the first target object in the first drifting state to complete a game task being longer than a second time duration consumed by the first target object in the second drifting state to complete the game task.

2. The method according to claim 1, wherein the adjusting, by the device based on the state adjustment instruction, the movement state of the first target object from the first drifting state to the second drifting state comprises:
    obtaining, by the device, a first parameter value, the first parameter value being a value of acting force the first target object suffers in the first drifting state; and
    adjusting, by the device, the first parameter value to a second parameter value, the second parameter value being a value of the acting force the first target object suffers in the second drifting state.

3. The method according to claim 2, wherein the adjusting the first parameter value to the second parameter value comprises at least one of the following:
  in response to the acting force comprising advancing power, the first parameter value comprising a first power parameter value, and the second parameter value comprising a second power parameter value, increasing, by the device, the first power parameter value to the second power parameter value according to a first target proportion; and
  in response to the acting force comprising friction, the first parameter value comprising a first friction parameter value, and the second parameter value comprising a second friction parameter value, decreasing, by the device, the first friction parameter value to the second friction parameter value according to a second target proportion.

4. The method according to claim 2, wherein before the adjusting the first parameter value to the second parameter value, the method further comprises:
  determining a quantity of times that the first or the second target action is performed in an action combination; and
  determining a target proportion according to the quantity, the target proportion being used for adjusting the first parameter value to the second parameter value.

5. The method according to claim 1, wherein after the adjusting, by the device based on the state adjustment instruction, the movement state of the first target object from the first drifting state to the second drifting state, the method further comprises:
  controlling, by the device, the first target object in the second drifting state to perform the game task.

6. The method according to claim 5, wherein the controlling the first target object to perform the game task in the second drifting state comprises:
  determining, by the device, a trigger time point of the state adjustment instruction; and
  controlling, by the device, the first target object in the second drifting state to perform the game task from the trigger time point to a target time point, the target time point being determined according to an action difficulty coefficient in performing an action combination.

7. The method according to claim 5, wherein:
  a second target object is in the game task; and
  the controlling the first target object in the second drifting state to perform the game task comprises:
    in response to the first target object being in the second drifting state and the first target object being detected to collide with the second target object, controlling, by the device, the first target object to generate first collision force to the second target object, the first collision force being greater than second collision force, and the second collision force being collision force generated in a case that the first target object is in the first drifting state and collides with the second target object.

8. An apparatus for controlling an object, the apparatus comprising:
  a memory storing instructions; and
  a processor in communication with the memory, wherein, when the processor executes the instructions, the processor is configured to cause the apparatus to perform:
    detecting a second slip angle caused by a first target action and a second target action performed by a first target object, wherein
      the first target action causes the first target object to enter a first drifting state with a first slip angle, and the second target action performed during the first drifting state increases the first slip angle to the second slip angle, and wherein
      the first and second slip angles are angles between an advancing direction and a sliding direction of the first target object; and
    triggering a state adjustment instruction in response to the second slip angle reaching a trigger threshold, the state adjustment instruction adjusting a movement state of the first target object from the first drifting state to a second drifting state, a first time duration consumed by the first target object in the first drifting state to complete a game task being longer than a second time duration consumed by the first target object in the second drifting state to complete the game task.

9. The apparatus according to claim 8, wherein, when the processor is configured to cause the apparatus to perform adjusting, based on the state adjustment instruction, the movement state of the first target object from the first drifting state to the second drifting state, the processor is configured to cause the apparatus to perform:
  obtaining a first parameter value, the first parameter value being a value of acting force the first target object suffers in the first drifting state; and
  adjusting the first parameter value to a second parameter value, the second parameter value being a value of the acting force the first target object suffers in the second drifting state.

10. The apparatus according to claim 9, wherein, when the processor is configured to cause the apparatus to perform adjusting the first parameter value to the second parameter value, the processor is configured to cause the apparatus to perform at least one of the following:
  in response to the acting force comprising advancing power, the first parameter value comprising a first power parameter value, and the second parameter value comprising a second power parameter value, increasing the first power parameter value to the second power parameter value according to a first target proportion; and
  in response to the acting force comprising friction, the first parameter value comprising a first friction parameter value, and the second parameter value comprising a second friction parameter value, decreasing the first friction parameter value to the second friction parameter value according to a second target proportion.

11. The apparatus according to claim 9, wherein, before the processor is configured to cause the apparatus to perform adjusting the first parameter value to the second parameter value, the processor is configured to further cause the apparatus to perform:
  determining a quantity of times that the first or the second target action is performed in an action combination; and
  determining a target proportion according to the quantity, the target proportion being used for adjusting the first parameter value to the second parameter value.

12. The apparatus according to claim 8, wherein, after the processor is configured to cause the apparatus to perform adjusting, based on the state adjustment instruction, the movement state of the first target object from the first drifting state to the second drifting state, the processor is configured to further cause the apparatus to perform:

controlling the first target object in the second drifting state to perform the game task.

13. The apparatus according to claim 12, wherein, when the processor is configured to cause the apparatus to perform controlling the first target object to perform the game task in the second drifting state, the processor is configured to cause the apparatus to perform:
determining a trigger time point of the state adjustment instruction; and
controlling the first target object in the second drifting state to perform the game task from the trigger time point to a target time point, the target time point being determined according to an action difficulty coefficient in performing an action combination.

14. The apparatus according to claim 12, wherein:
a second target object is in the game task; and
when the processor is configured to cause the apparatus to perform controlling the first target object in the second drifting state to perform the game task, the processor is configured to cause the apparatus to perform:
in response to the first target object being in the second drifting state and the first target object being detected to collide with the second target object, controlling the first target object to generate first collision force to the second target object, the first collision force being greater than second collision force, and the second collision force being collision force generated in a case that the first target object is in the first drifting state and collides with the second target object.

15. A non-transitory computer readable storage medium storing computer readable instructions, wherein, the computer readable instructions, when executed by a processor, are configured to cause the processor to perform:
detecting a second slip angle caused by a first target action and a second target action performed by a first target object, wherein
the first target action causes the first target object to enter a first drifting state with a first slip angle, and the second target action performed during the first drifting state increases the first slip angle to the second slip angle, and wherein
the first and second slip angles are angles between an advancing direction and a sliding direction of the first target object; and
triggering a state adjustment instruction in response to the second slip angle reaching a trigger threshold, the state adjustment instruction adjusting a movement state of the first target object from the first drifting state to a second drifting state, a first time duration consumed by the first target object in the first drifting state to complete a game task being longer than a second time duration consumed by the first target object in the second drifting state to complete the game task.

16. The non-transitory computer readable storage medium according to claim 15, wherein, when the computer readable instructions are configured to cause the processor to perform adjusting, based on the state adjustment instruction, the movement state of the first target object from the first drifting state to the second drifting state, the computer readable instructions are configured to cause the processor to perform:

obtaining a first parameter value, the first parameter value being a value of acting force the first target object suffers in the first drifting state; and
adjusting the first parameter value to a second parameter value, the second parameter value being a value of the acting force the first target object suffers in the second drifting state.

17. The non-transitory computer readable storage medium according to claim 16, wherein, when the computer readable instructions are configured to cause the processor to perform adjusting the first parameter value to the second parameter value, the computer readable instructions are configured to cause the processor to perform at least one of the following:
in response to the acting force comprising advancing power, the first parameter value comprising a first power parameter value, and the second parameter value comprising a second power parameter value, increasing the first power parameter value to the second power parameter value according to a first target proportion; and
in response to the acting force comprising friction, the first parameter value comprising a first friction parameter value, and the second parameter value comprising a second friction parameter value, decreasing the first friction parameter value to the second friction parameter value according to a second target proportion.

18. The non-transitory computer readable storage medium according to claim 16, wherein, before the computer readable instructions are configured to cause the processor to perform adjusting the first parameter value to the second parameter value, the computer readable instructions are configured to further cause the processor to perform:
determining a quantity of times that the first or the second target action is performed in an action combination; and
determining a target proportion according to the quantity, the target proportion being used for adjusting the first parameter value to the second parameter value.

19. The non-transitory computer readable storage medium according to claim 15, wherein, after the computer readable instructions are configured to cause the processor to perform adjusting, based on the state adjustment instruction, the movement state of the first target object from the first drifting state to the second drifting state, the computer readable instructions are configured to further cause the processor to perform:
controlling the first target object in the second drifting state to perform the game task.

20. The non-transitory computer readable storage medium according to claim 19, wherein, when the computer readable instructions are configured to cause the processor to perform controlling the first target object to perform the game task in the second drifting state, the computer readable instructions are configured to cause the processor to perform:
determining a trigger time point of the state adjustment instruction; and
controlling the first target object in the second drifting state to perform the game task from the trigger time point to a target time point, the target time point being determined according to an action difficulty coefficient in performing an action combination.

* * * * *